United States Patent
Bohner et al.

[19]

[11] Patent Number: 6,047,788
[45] Date of Patent: Apr. 11, 2000

[54] HYDRAULIC POWER STEERING SYSTEM WITH DUAL, DOUBLE-ACTING PISTON-CYLINDER UNITS

[75] Inventors: Hubert Bohner, Böblingen; Martin Moser, Fellbach, both of Germany

[73] Assignee: DaimlerChrysler A.G., Stuttgart, Germany

[21] Appl. No.: 08/887,834

[22] Filed: Jul. 3, 1997

[30] Foreign Application Priority Data

Jul. 11, 1995 [DE] Germany .............................. 196 27 893

[51] Int. Cl.[7] .............................. B62D 5/30; F01B 7/00
[52] U.S. Cl. .............................................. 180/406; 92/151
[58] Field of Search ........................... 180/406; 92/151, 92/152, 110, 255, 258

[56] References Cited

U.S. PATENT DOCUMENTS

| | | | |
|---|---|---|---|
| 3,832,849 | 9/1974 | Lang ........................................ | 60/386 |
| 4,372,413 | 2/1983 | Petersen et al. ......................... | 180/152 |
| 5,251,717 | 10/1993 | Klosterhaus ............................. | 180/148 |
| 5,778,760 | 7/1998 | Yuda ........................................ | 92/151 |
| 5,862,878 | 1/1999 | Bohner et al. ........................... | 180/403 |

FOREIGN PATENT DOCUMENTS

| | | |
|---|---|---|
| 0 307 612 | 12/1982 | European Pat. Off. . |
| 29 44 883 | 8/1982 | Germany . |
| 43 31 291 | 12/1994 | Germany . |
| 44 35 848 | 4/1996 | Germany . |
| 57-198168 | 12/1982 | Japan . |

*Primary Examiner*—J. J. Swann
*Assistant Examiner*—Andrew J. Ririe
*Attorney, Agent, or Firm*—Klaus J. Bach

[57] ABSTRACT

In a hydraulically operated steering for a motor vehicle comprising a control motor with first and second double acting piston and cylinder units arranged in axial alignment and a single piston rod extending through the first and second double acting piston and cylinder units, at least one of the double acting piston and cylinder units includes an annular piston which is fastened on the pistons rod in a predetermined axial position and an annular divider wall is disposed between the pistons for slidably supporting the piston rod and separating the cylinders of said first and second double acting piston and cylinder units fluidically from one another so as to form cylinder chambers for said pistons limited at one side by an annular divider wall and by guide sleeve members disposed in the opposite ends of the cylinder units.

4 Claims, 3 Drawing Sheets

HYDRAULIC POWER STEERING SYSTEM WITH DUAL, DOUBLE-ACTING PISTON-CYLINDER UNITS

BACKGROUND OF THE INVENTION

The present resides in a hydraulic power steering for motor vehicles with a servomotor having first and second double-acting piston-cylinder units which are arranged co-axially and include a common piston rod.

Motor vehicles are generally provided with factory installed hydraulic power steerings wherein a steering handle or rather steering wheel and the steered vehicle wheels are mechanically coupled with one another. The power steering includes a servomotor with a double acting piston-cylinder unit which is operated depending on the forces and torques effective between the steering handle or steering wheel and the vehicle wheels in such a way that only limited forces are required for actuating the steering handle or turning the steering wheel. As a result, large forces or torques effective between the steering handle or steering wheel and the steered vehicle wheels are mainly taken up, or generated, by the hydraulic piston cylinder unit.

Furthermore, there are presently steering systems for normal street vehicles in the design stage which have no mechanical coupling between the steering wheel and the steered vehicle wheels. In these systems, the steering handle or steering wheel and the steered vehicle wheels are rather coupled only by way of a control system wherein only a setting means for the respective desired steering angle is operated by the steering handle or steering wheel to which angle the steered vehicle wheels are then adjusted by the control system. The control system can take additional parameters into consideration and can for example change the transmission ratio between the steering control movement of the steering handle or the steering wheel and the adjustment angle of the steered vehicle wheels depending on the vehicle speed. Furthermore, skidding movements of the vehicle can be automatically counteracted before the driver makes the appropriate steering correction or without the driver making any steering correction.

DE 29 44 833 C2 discloses a steering system which includes the features mentioned initially. It is basically a hydrostatic steering system with two parallel hydraulic operating mechanisms. It permits the elimination of the steering column which requires a relatively large amount of space and which increases the chances for a driver to be injured during an accident EP 0 307 612 A1 discloses a power steering system wherein the steered vehicle wheels and the driver-operated steering wheel are mechanically interconnected. In addition, a hydraulic power steering unit with two parallel hydraulic circuits is provided which includes two piston-cylinder units separated by a cylinder separating wall which separates the cylinders hydraulically but through which the piston rod extends. The two cylinders are formed in a common single-piece cylindrical tube component.

DE 44 35 848 A1 discloses a servomotor consisting of a piston-cylinder unit with an annular piston member which has axial annular flanges at its inner circumference which are received in corresponding grooves formed in the piston rod.

DE 43 31 291 C1 and JP57-198168A disclose rack and pinion steering systems with a piston-cylinder units with boots disposed at the ends of the cylinders enclosing spaces which are in communication by way of an axial bore extending through the piston rod or pinion. In addition, the last mentioned reference discloses joints arranged at the opposite ends of the piston rod which cooperate with end portions of the cylinder so as to form stops for limiting travel of the piston rod.

The present invention resides in a steering system which has no need for a firm mechanical connection between a steering handle or wheel and the steered vehicle wheels. This system is similar to the control of control flaps of modern airplanes; such systems are known there under the designation "fly-by-wire" systems.

In order to provide for vehicle steering systems without mechanical coupling between the steering handle or steering wheel which are safe under any circumstances, redundancies or so called back-up arrangements must be provided which insure safe operation of the vehicle even if an essential part of the system fails. Continued travel should be possible essentially without limitations.

It is the object of the invention to provide a simple vehicle steering system without a direct mechanical coupling between the steering wheel or handle and the steered vehicle wheels wherein nevertheless continued vehicle operation is possible even if an essential part of the system fails.

SUMMARY OF THE INVENTION

In a hydraulically operated steering for a motor vehicle comprising a control motor with first and second double acting piston and cylinder units arranged in axial alignment and a single piston rod extending through the first and second double acting piston and cylinder units, at least one of the double acting piston and cylinder units includes an annular piston which is fastened on the pistons rod in a predetermined axial position and an annular divider wall is disposed between the pistons for slidably supporting the piston rod and separating the cylinders of the first and second double acting piston and cylinder units fluidically from one another so as to form cylinder chambers for the pistons limited at one side by the annular divider wall and by guide sleeve members disposed in the opposite ends of the cylinder units.

The invention is based on the general concept of using redundant steering systems, that is, to use for the control of the steered vehicle wheels two parallel piston-cylinder units of which one is normally in use for controlling the steered vehicle wheels whereas the other is used during an emergency as a backup system. The two piston cylinder units consist of a single unit which, in its design, is similar to conventional power steering units wherein the piston rod of a double-acting piston cylinder unit and the toothed rack comprises a single piece which is engaged by a pinion associated with a steering wheel so as to be driven thereby. With the arrangement according to the invention, however, instead of the toothed rack, essentially only an elongated piston rod is required which is provided with a first and a second piston disposed in first and second cylinders. The first and second cylinders are disposed axially adjacent one another and receive the first and second pistons respectively. The double cylinder and piston arrangement is formed as an integral unit.

Preferred embodiments and features of the invention will be described in greater detail below on the basis of the accompanying drawings.

DESCRIPTION OF THE PREFERRED EMBODIMENTS

Figure 1:
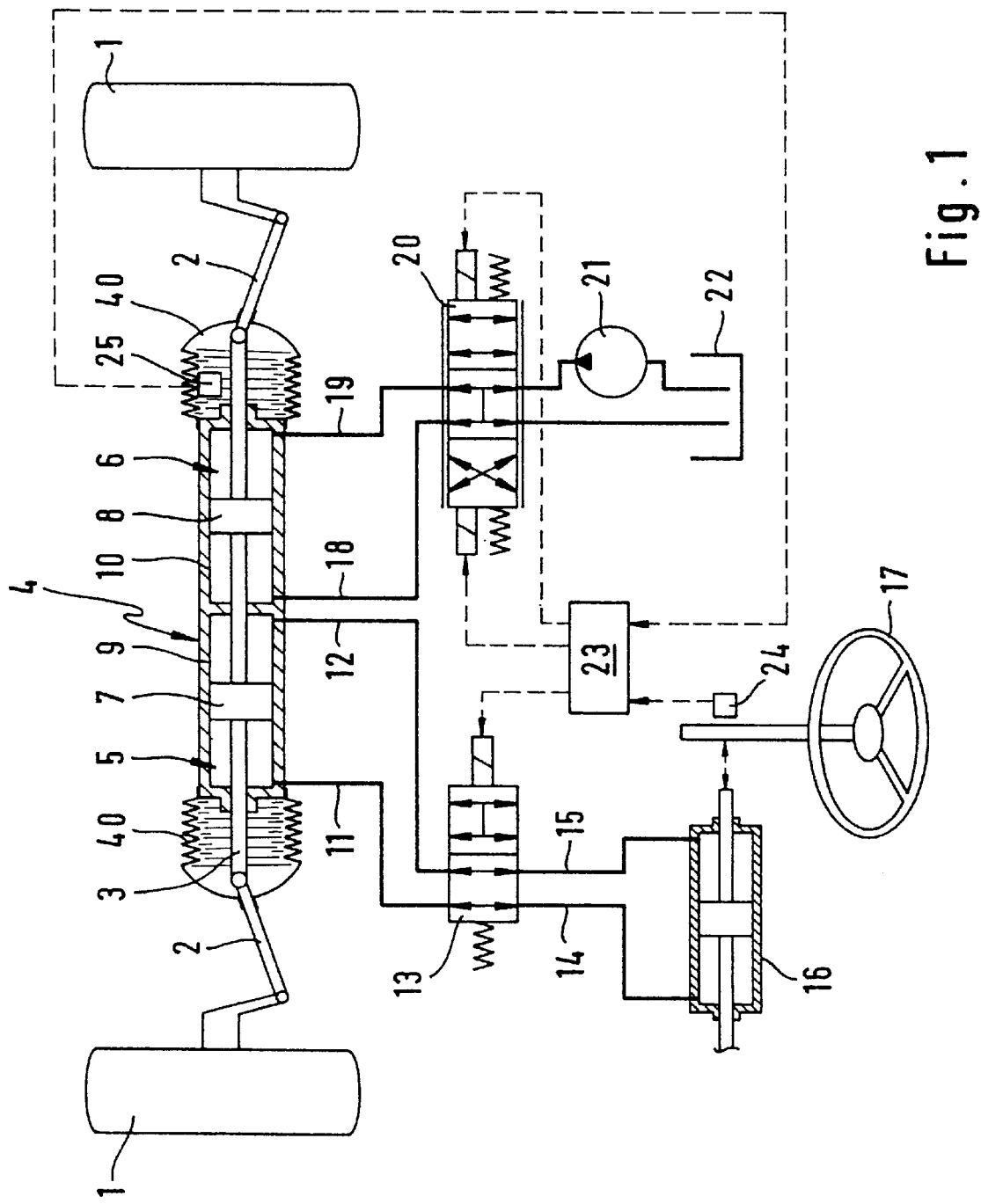
FIG. 1 is a schematic representation of a power steering according to the invention without mechanical connection between a steering wheel and the steered vehicle wheels.

As shown in FIG. 1, a motor vehicle which is not shown in detail includes two steered vehicle wheels 1 which are coupled mechanically, by way of tie rods 2, with a piston rod 3 of a piston-cylinder assembly 4 such that axial movement of the piston rod 3 causes a change of the steering angle of the steered vehicle wheels 1.

The piston-cylinder assembly 4 includes two double acting piston-cylinder units 5 and 6 including pistons 7 and 8 respectively, disposed in cylinders 9 and 10 and dividing the cylinder units 9 and 10 each into two chambers.

The two chambers of the cylinder unit 9 are in communication with a switch-over valve 13 by way of conduits 11 and 12 and further by way of conduits 14 and 15 with a double acting piston cylinder arrangement 16 whose piston is operatively connected mechanically to a steering wheel 17 of a vehicle.

The cylinder unit 10 is in communication, by way of conduits 18 and 19, with a control valve 20 and further, with the pressure side of a hydraulic pump 21 or another hydraulic pressure source and a low pressure hydraulic fluid reservoir 22. The suction side of the hydraulic pump 21 is also in communication with the hydraulic fluid reservoir 22.

The control valve 20 is operated by a control unit 23 which is connected at its input side to a desired valve setting means 24 operated by the steering wheel 17 and an actual value sensor 25 for indicating the actual steering angle of the steered vehicle wheels 1. The control unit 23 has further inputs for additional parameters which are not shown, however. On the output side, the control unit is connected to the control magnet of the switch-over valve 13.

The arrangement, as shown in FIG. 1 operates as follows: Under normal operation, the control magnet of the switch-over valve 13 is energized by the control unit 23 such that the switch-over valve 13 is held against the force of a return spring in its other position not shown in FIG. 1, wherein the pistons in the piston-cylinder assembly 5 as well as in the piston-cylinder arrangement 16 are freely movable. The steering wheel 17 operates the desired value setting means 24 which provides accordingly a desired value for the steering angle of the steered vehicle wheels 1. Depending on a desired value to actual value comparison, which is performed by the control unit 23 utilizing the signals from the desired value setting means 24 and the actual value sensor 25, the control unit 23 operates the control valve 20 in such a manner that a certain pressure difference between the two chambers of the piston-cylinder unit 6 is established when there is a need for a position adjustment so as to provide for a piston force in one or the other direction for actuating the steering mechanism for the steered vehicle wheels 1. The control unit 23 constantly supervises itself for proper operation. If a malfunction should occur, the electromagnetic control structures of the control valve 20 and the control magnet of the switch-over valve 13 are de-energized with the result that the control valve 20 is switched, by the return spring arrangement, to a position in which the piston 8 is freely movable in the cylinder 10. At the same time, the switch-over valve 13 is switched to the position as shown in FIG. 1, wherein the piston cylinder unit 5 and the piston cylinder arrangement 16 are hydraulically coupled. Consequently, the steering wheel 17 and the steered vehicle wheels are coupled with each other by way of a hydraulic "steering column".

Figure 2:
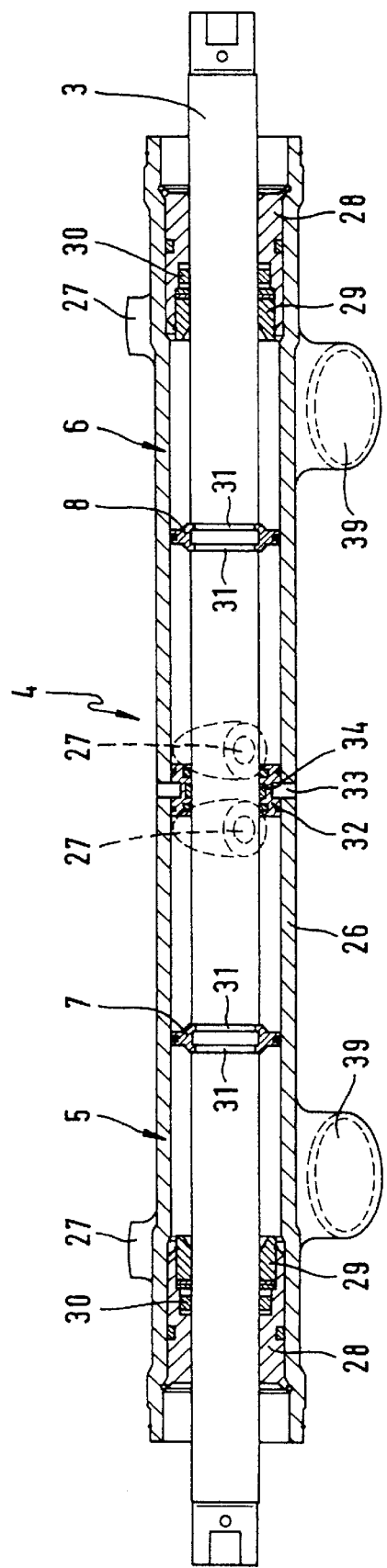
FIG. 2 is an axial cross-sectional view of one embodiment of a power steering with two double-acting piston cylinder units included in a single unitary cylinder structure.

The piston-cylinder assembly 4 as shown in FIG. 2 includes for both piston-,cylinder units 5 and 6 a common cylinder tube component 26 with connections 27 at the side thereof for the conduits 11, 12, 18 and 19 (see FIG. 1). The opposite ends of the cylinder tube component are slightly widened in a step-like fashion and receive guide sleeve members 28 with external annular grooves receiving a seal ring for sealing any gap between the guide sleeve members 28 and the cylinder tube component 26. The piston 3 extends through the guide sleeve members 28 and is radially supported therein by means of bearing sleeves 29 mounted on the guide sleeve members 28. Axially adjacent the bearing sleeve 29, the inner surface of the guide sleeve member 28 includes an annular recess receiving a seal 20 which sealingly surrounds the piston rod 3 but permits axial movement thereof.

The pistons 7 and 8 are annular members which are sled onto the piston rod 3. They have at their inner axial ends annular axial flanges which are pressed into annular grooves 31 formed in th piston rod 3 by deforming the annular axial flanges by means of a roller tool. The pistons 7 and 8 are firmly engaged in this manner with the piston rod 3.

Disposed in the cylinder tube component 26 between the pistons 7 and 8 is a divider wall ring 32 which is mounted to the cylinder tube component 23 by pins 33. For mounting, the divider wall ring 32 is placed on the piston rod 3 between the pistons 7 and 8 and the piston rod with the pistons and the divider wall ring 32 are then inserted into the cylinder tube component until the divider wall ring reaches the axial position as shown in FIG. 2. Then the pins 33 are inserted through radial bores in the cylinder tube component 26 so that they project into a circumferential groove in the divider wall ring 32 to thereby hold the divider wall ring 32 in position within the cylinder tube component 26. In addition to the circumferential groove for the pins 33, the divider wall ring 32 includes two additional circumferential grooves in which seal rings are disposed for sealing the gap between the outer circumference of the divider wall ring 32 and the inner surface of the cylinder tube component 26. At its inner circumference, the divider wall ring 32 is provided with annular grooves receiving seals for the piston rod 3 and, between these grooves a bearing sleeve 34 for slidably supporting the piston rod 3.

Figure 3:
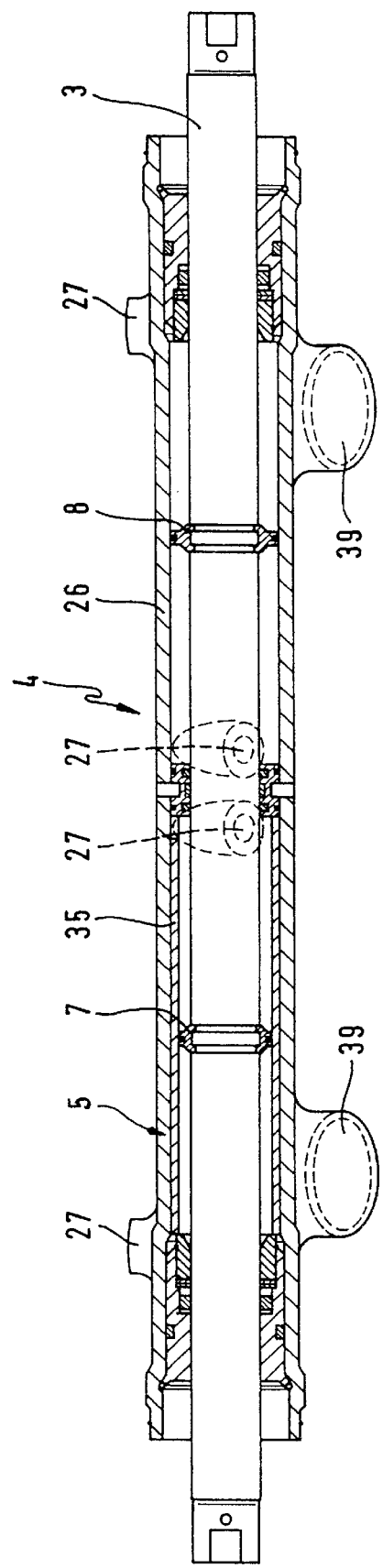
FIG. 3 is a cross-sectional view like that shown in FIG. 2 for a somewhat modified embodiment.

The embodiment as shown in FIG. 3 is essentially the same as that shown in FIG. 2 except that the left hand cylinder unit 5 includes a cylinder sleeve 35 on the left side of the divider wall ring 32 for reducing the cross-section of the cylinder 9. The associated piston 7 has a correspondingly smaller outer diameter. At its axial ends, the cylinder sleeve 35 is provided with axial slots or other recesses such that the connections 27 of the cylinder 9 are in communication with the respective chambers of the cylinder sleeve 35.

Figure 4:
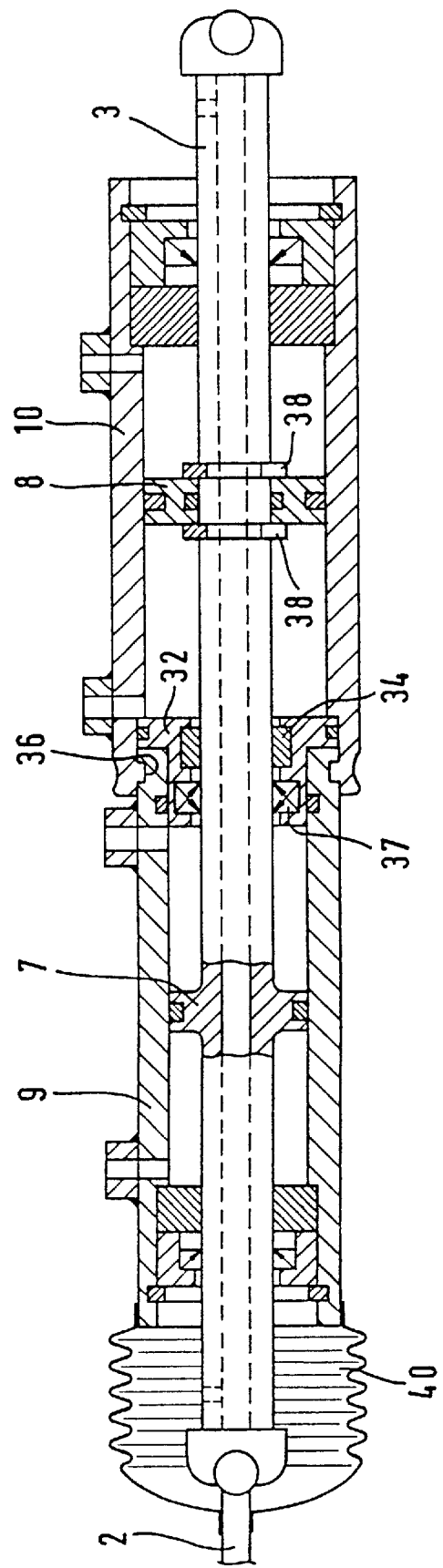
FIG. 4 is an axial cross-sectional view of an embodiment of the invention, wherein for each piston cylinder unit a separate cylinder structure is provided, the two cylinder structures being firmly interconnected.

In the embodiment of FIG. 4, the cylinders 9 and 10 are separate components which are joined at their adjacent ends. For joining, the cylinder 10 which has a somewhat larger diameter than the cylinder 9, extends over, and receives, an end portion of the cylinder 9. In the example as given in FIG. 4, the end of the cylinder 10 is compressed so as to extend into a circumferential groove 36 in the cylinder 9 for firm engagement therewith.

The divider wall ring 32 of the arrangement as shown in FIG. 4 has a flange-like annular shoulder formed at one axial end thereof which shoulder is received in an annular recess formed between an annular shoulder at the axial end of the cylinder 10 and the front end face of the cylinder 9.

The gaps between the outer circumference of the divider wall ring 32 or its annular flange portion and the inner circumference of the cylinders 9 and 10 are sealed by seal rings which are disposed in annular grooves formed in the innner circumference of the cylinder 9 and, respectively, the outer circumference of the annular flange portion of the divider wall ring 32.

In the embodiment as shown in FIG. 4, the divider wall ring 32 has at its inner circumference only a single seal 37 which is disposed axially adjacent the bearing sleeve 34 in order to seal the annular gap between the piston rod and the inner circumference of the divider wall ring 32. FIG. 4 further shows one of the pistons 7 and 8, that is, piston 7 to be integrally formed with the piston rod 3. The other piston 8 is again an annular member which is disposed on the piston rod 3 where it is mounted in this particular example by rings 38 which are seated in corresponding annular grooves formed in the piston rod 3. In this embodiment, the annular gap between the piston rod 3 and the piston 8 is sealed by a seal ring which is disposed in an annular groove formed in the inner circumference of the annular piston 8.

In all the embodiments as shown in FIGS. 2 to 4, the cylinders 9 and 10 or the cylinder tube component 26 may be provided with support legs or parts 39 (only shown in FIGS. 2 and 3) for mounting the piston cylinder assembly 4 to the chassis or frame structure of a vehicle.

In order to protect the connection joints between the piston rod 3 and the tie rods 2 and also the support bearing structure for the piston rod 3 in the sleeve guide members 28 from dust, there are provided protective boots 40 which are attached at one end to the adjacent ends of the cylinders 9 and 10, or respectively, the cylinder tube component 26, and at the other end to tie rods 2. It is advantageous if the spaces enclosed by the boots are in communication by an axial bore extending through the piston rod 3 so that, during axial movement of the piston rod 3, air can flow from one of the boot spaces to the other through the axial bore in the piston rod 3. During such axial movement of the piston rod 3, the space enclosed by one of boots 40 increases while the space enclosed by the other boot decreases at the same rate.

What is claimed is:

1. A hydraulically operated steering for a motor vehicle comprising a control motor including a first double acting piston and cylinder unit and a second double acting piston and cylinder unit arranged in axial alignment with, and adjacent to, said first double acting piston and cylinder unit, a single piston rod extending through said first and second double acting piston and cylinder units, at least one of said double acting piston and cylinder units having an annular piston disposed on said piston rod and being fastened thereto in a predetermined axial position, said first and second piston and cylinder units including a divider wall ring disposed between said two double acting pistons and having a central opening slidably receiving said piston rod so as to separate said first and second double acting piston and cylinder units fluidically from one another, said piston and cylinder units including cylinder tubes which overlap each other in the area around said divider wall ring and are firmly joined in the area of said divider wall ring and which have opposite outer ends with guide sleeve members providing, together with said divider wall ring, sealed cylinder chambers and forming support bearing structures for axially slidably supporting said piston rod.

2. A steering according to claim 1, wherein at least said annular piston of said one double acting piston and cylinder unit has at its inner circumference at least one axially extending flange and said piston rod has an annular groove into which said annular flange is pressed for firm engagement of said annular piston with said piston rod.

3. A steering according to claim 1, wherein one of said cylinders has an end portion adjacent said other cylinder which has a diameter larger than that of the adjacent end portion of the other cylinder and receives the end portion of said other cylinder, said other cylinder end portion having a circumferential groove into which a portion of the end portion of said one cylinder is pressed for firm engagement therewith.

4. A steering according to claim 1, wherein boots are provided at the opposite ends of said piston cylinder units and said piston rod has an axial bore extending therethrough and providing communication between the spaces enclosed by said boots.

* * * * *